US011076415B2

(12) United States Patent
Wang et al.

(10) Patent No.: US 11,076,415 B2
(45) Date of Patent: Jul. 27, 2021

(54) METHODS AND APPARATUS FOR BACKHAUL AND ACCESS LINK SCHEDULING IN INTEGRATED ACCESS AND BACKHAUL NETWORKS AND SYNCHRONIZED NETWORKS

(71) Applicant: QUALCOMM Incorporated, San Diego, CA (US)

(72) Inventors: Hua Wang, Basking Ridge, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 17 days.

(21) Appl. No.: 16/525,141

(22) Filed: Jul. 29, 2019

(65) Prior Publication Data

US 2019/0357241 A1 Nov. 21, 2019

Related U.S. Application Data

(63) Continuation of application No. 15/055,368, filed on Feb. 26, 2016, now Pat. No. 10,383,136.

(Continued)

(51) Int. Cl.
*H04J 3/00* (2006.01)
*H04W 72/12* (2009.01)
*H04W 92/14* (2009.01)

(52) U.S. Cl.
CPC ... *H04W 72/1263* (2013.01); *H04W 72/1226* (2013.01); *H04W 92/14* (2013.01)

(58) Field of Classification Search
CPC .......... H04W 72/0446; H04W 72/042; H04W 72/0413; H04W 72/1263; H04W 72/1226; H04W 92/14; H04L 5/0048; H04L 5/0053
See application file for complete search history.

(56) References Cited

U.S. PATENT DOCUMENTS 7,606,574 B2 10/2009 Classon et al.
9,019,841 B2 4/2015 Tavildar et al.
(Continued)

FOREIGN PATENT DOCUMENTS

EP 2123062 B1 8/2013
EP 3051890 A1 8/2016
(Continued)

OTHER PUBLICATIONS

Catt: "Considerations for TDD Relay Frame Structure," 3GPP Draft; R1-091523, 3rd Generation Partnership Project (3GPP), Mobile Competence Centre ; 650, Route Des Lucioles ; F-06921 Sophia-Antipolis Cedex France, No. Seoul, Korea; Mar. 18, 2009, Mar. 18, 2009 (Mar. 18, 2009), XP050339081, [retrieved on Mar. 18, 2009].

(Continued)

*Primary Examiner* — Atique Ahmed
(74) *Attorney, Agent, or Firm* — QUALCOMM Incorporated

(57) ABSTRACT

A method, an apparatus, and a computer program product for wireless communication are provided in which a scheduling entity determines a first direction of a backhaul link traffic between a first scheduling entity and a second scheduling entity, and determines a second direction of an access link traffic between the scheduling entity and a user equipment (UE) based on the first direction of the backhaul link traffic to reduce potential interference caused by the access link traffic. The scheduling entity transmits or receives the access link traffic in the second direction utilizing at least one of a same transmission resource of the backhaul lick traffic. Other aspects, embodiments, and features are also claimed and described.

18 Claims, 13 Drawing Sheets

Related U.S. Application Data

(60) Provisional application No. 62/209,146, filed on Aug. 24, 2015.

(56) References Cited

U.S. PATENT DOCUMENTS

| | | | |
|---|---|---|---|
| 9,078,270 | B2 | 7/2015 | Ji et al. |
| 2010/0110964 | A1* | 5/2010 | Love ................. H04W 72/1278 370/312 |
| 2010/0316096 | A1 | 12/2010 | Adjakple et al. |
| 2011/0051654 | A1* | 3/2011 | Blankenship ........ H04B 7/2606 370/315 |
| 2011/0222428 | A1* | 9/2011 | Charbit ................. H04W 16/26 370/252 |
| 2011/0228700 | A1* | 9/2011 | Mildh ................... H04W 24/02 370/254 |
| 2011/0269393 | A1 | 11/2011 | Oestergaard et al. |
| 2011/0319084 | A1* | 12/2011 | Meshkati ............. H04B 17/345 455/436 |
| 2012/0044852 | A1 | 2/2012 | Zhang et al. |
| 2012/0106437 | A1 | 5/2012 | Seo et al. |
| 2012/0250526 | A1 | 10/2012 | Zhao et al. |
| 2013/0194982 | A1* | 8/2013 | Fwu ....................... H04B 7/024 370/280 |
| 2013/0230013 | A1* | 9/2013 | Seo ..................... H04L 27/2602 370/329 |
| 2013/0242931 | A1 | 9/2013 | Bi et al. |
| 2013/0315109 | A1* | 11/2013 | Raaf .................. H04B 7/15528 370/277 |
| 2014/0003301 | A1* | 1/2014 | Madan ...................... H04L 5/14 370/280 |
| 2014/0269455 | A1 | 9/2014 | Kim et al. |
| 2014/0301371 | A1 | 10/2014 | Maeda et al. |
| 2015/0063200 | A1 | 3/2015 | Seo et al. |
| 2017/0064731 | A1 | 3/2017 | Wang et al. |

FOREIGN PATENT DOCUMENTS

| | | |
|---|---|---|
| WO | 2011054372 A1 | 5/2011 |
| WO | 2015045555 A1 | 4/2015 |

OTHER PUBLICATIONS

CMCC: "Considerations on Backhaul Interference and Synchronization for Relay," Feb. 17, 2010 (Feb. 17, 2010), 3GPP Draft; R1-101384 Considerations on Backhaul Interference and Synchronization for Relay, 3rd Generation Partnership Project (3GPP), Mobile Competence Centre ; 650, Route Des Lucioles ; F-06921 Sophia-Antipolis Cedex ; France, XP050418994, [retrieved on Feb. 17, 2010].

International Search Report and Written Opinion—PCT/US2016/043938—ISA/EPO—dated Oct. 13, 2016.

* cited by examiner

METHODS AND APPARATUS FOR BACKHAUL AND ACCESS LINK SCHEDULING IN INTEGRATED ACCESS AND BACKHAUL NETWORKS AND SYNCHRONIZED NETWORKS

PRIORITY CLAIM

This application is a continuation application of prior application Ser. No. 15/055,368, filed Feb. 26, 2016, which claims priority to and the benefit of provisional patent application No. 62/209,146 filed in the United States Patent and Trademark Office on Aug. 24, 2015. The entire content of both prior applications is incorporated herein by reference as if fully set forth below in its entirety and for all applicable purposes.

TECHNICAL FIELD

The technology discussed below relates generally to wireless communication systems, and more particularly, backhaul and access link traffic scheduling in wireless communication networks. Embodiments can provide and enable techniques for scheduling data communications in integrated access and backhaul integrated arrangements for efficient spectrum utilization, improved network throughput, and continued enhanced user experience.

INTRODUCTION

Multiple access technologies have been adopted in various telecommunication standards to enable different wireless devices to communicate on a peer-to-peer, municipal, national, regional, and even global level. A wireless communication network may include one or more scheduling entities each communicating with one or more subordinate entities. A communication connection or link between two scheduling entities may be referred to as a backhaul link (or backhaul), and a communication connection or link between a scheduling entity and a subordinate entity may be referred to as an access link. In general, the backhaul link and the access link utilize different transmission resources for uplink and/or downlink communication such that interference may be avoided or reduced. Such wireless communication network may be called a non-integrated access and backhaul system because the access link and the backhaul link are assigned or allocated different transmission resources.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure relate to an integrated access and backhaul (IAB) system and methods for operating an IAB system. In an IAB system, an access link between a scheduling entity and a subordinate entity, and a backhaul link between scheduling entities, may utilize the same transmission resource for uplink and/or downlink communication.

In one aspect, the disclosure provides a method of wireless communication operable at a macro base station communicatively connected with a first pico base station and a second pico base station. The macro base station schedule backhaul link traffic between the macro base station and the first pico base station utilizing a transmission resource. The macro base station determine potential interference at the macro base station or the first pico base station, caused by opportunistically rescheduling the transmission resource for opportunistic access link traffic between the second pico base station and a user equipment (UE). If the potential interference caused by the opportunistic access link traffic is less than a predetermined threshold, the macro base station reschedules the transmission resource for the opportunistic access link traffic.

In another aspect, the disclosure provides a macro base station for wireless communication. The macro base station includes a communication interface configured for wireless communication with a first pico base station and a second pico base station, a memory including executable code, and a processor operatively coupled to the communication interface and the memory. The macro base station is configured to schedule backhaul link traffic between the macro base station and the first pico base station utilizing a transmission resource. The macro base station is configured to determine potential interference at the macro base station or the first pico base station, caused by opportunistically rescheduling the transmission resource for opportunistic access link traffic between the second pico base station and a user equipment (UE). The macro base station is further configured to, if the potential interference caused by the opportunistic access link traffic is less than a predetermined threshold, reschedule the transmission resource for the opportunistic access link traffic.

In another aspect, the disclosure provides a macro base station for wireless communication. The macro base station includes a communication interface configured for wireless communication with a first pico base station and a second pico base station, a memory including executable code, and a processor operatively coupled to the communication interface and the memory. The macro base station is configured to schedule access link traffic between the second pico base station and a user equipment (UE) utilizing a transmission resource. The macro base station is further configured to determine potential interference at the UE or the second pico base station, caused by opportunistically rescheduling the transmission resource for opportunistic backhaul link traffic between the macro base station and the first pico base station. The macro base station is further configured to, if the potential interference caused by the opportunistic backhaul link traffic is less than a predetermined threshold, reschedule the transmission resource for the opportunistic backhaul link traffic.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
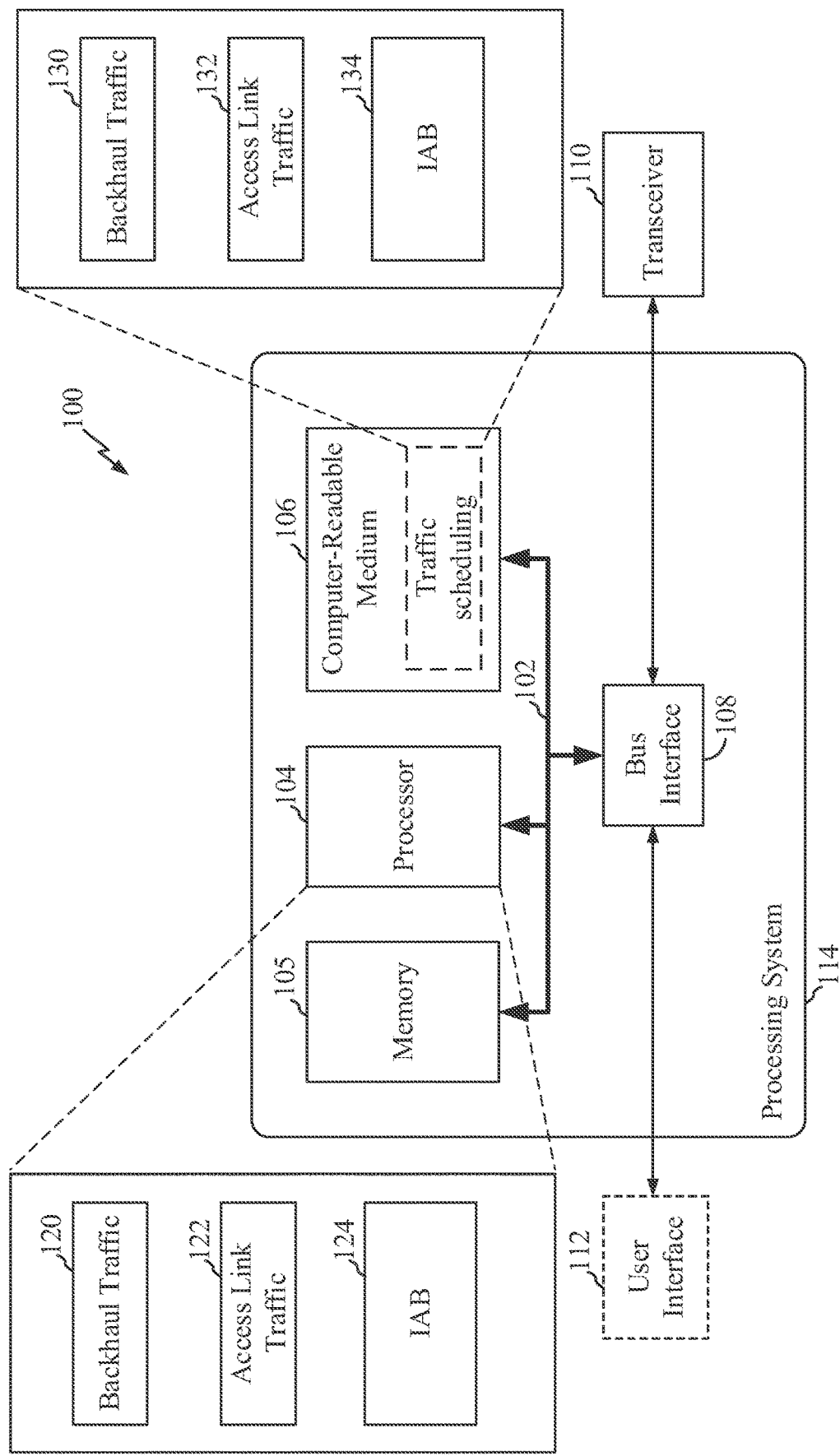
FIG. 1 is a diagram illustrating an example of a hardware implementation for an apparatus employing a processing system in accordance with an aspect of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects of the present disclosure relate to access link and backhaul scheduling in a synchronized network or an integrated access and backhaul (IAB) system. An exemplary IAB system includes a number of scheduling entities that control wireless access to associated subordinate entities. Examples of scheduling entities include Node B, eNB, base stations, and access points. Examples of subordinate entities include various wireless devices such as a user equipment (UE) and an access terminal. In some examples, the same device may be configured to include the functionalities of both a scheduling entity and a subordinate entity. Other non-limitation examples of the scheduling entity and subordinate entity include set-top boxes, routers, cable modems, digital subscriber line (DSL) modems, home appliances (e.g., oven, refrigerator, dishwasher, washer, dryer, television, security camera, home entertainment system, etc.), entertainment devices, industrial equipment, medical devices, network gateway devices, and Internet-of-Thing (IoT)/Internet-of-Everything (IoE) devices. A scheduling entity assigns, allocates, configures, and/or schedules network resources for supporting, maintaining, and/or establishing communication with one or more associated subordinate entities.

In some aspects of the disclosure, scheduling entities may include macro base stations and pico base stations. A typical heterogeneous network includes a higher power cell and a lower power cell. The high power cell may be referred to as macro cell, and the lower power cell may be referred to as a micro or small cell (or aka pico, femto, micro, etc.) cell. The macro cell is served by a base station (macro base station) transmitting with higher power than a base station (pico base station) serving the pico cell. A macro base station generally has a larger coverage area than that of a pico base station. Pico base stations are typically used to extend coverage to a small area such an indoor area where the signals of the macro cell cannot penetrate well, or to add network capacity in areas with high service demands. Cell sizing can be done according to system design as well as component constraints.

In some embodiments as discussed here, a communication link or connection between two scheduling entities (e.g., a macro base station and a pico base station) may be called a backhaul or backhaul link. A communication link between a scheduling entity (e.g., a base station) and a subordinate entity (e.g., user equipment) may be called an access link. In an IAB system, the access link and the backhaul may be assigned the same transmission resource such as time slots and frequency spectrum when the access link or backhaul is opportunistically scheduled. More detail of opportunistic scheduling is described with the examples below.

Several aspects of telecommunication systems are presented below with reference to various apparatuses and methods. These apparatuses and methods will be described in the following detailed description and illustrated in the accompanying drawing by various blocks, modules, components, circuits, steps, processes, algorithms, procedures, etc. (collectively referred to as "elements"). These elements may be implemented using electronic hardware, computer software, firmware, code or any combination thereof. Whether such elements are implemented as hardware or software depends upon the particular application and design constraints imposed on the overall system.

FIG. 1 is a diagram illustrating an example of a hardware implementation for an apparatus 100 employing a processing system 114. In accordance with various aspects of the disclosure, an element, or any portion of an element, or any combination of elements may be implemented with a processing system 114 that includes one or more processors 104. For example, the apparatus 100 may be a subordinate entity (e.g., user equipment (UE)) as illustrated in any one or more of FIGS. 2-5, 8, and/or 9. In another example, the apparatus 100 may be a scheduling entity (e.g., a macro base station or a pico base station) as illustrated in any one or more of FIGS. 2-5, 8, and/or 9. Examples of processors 104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 104, as utilized in an apparatus 100, may be used to implement any one or more of the processes and procedures described below and illustrated in FIGS. 10-13.

One or more processors 104 in the processing system 114 may execute software (executable software or code). Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 106.

The computer-readable medium 106 may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors (represented generally by the processor 104), a memory 105, and computer-readable media (represented generally by the computer-readable medium 106). The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. In some examples, the transceiver 110 may include one or more transmitters and/or receivers, and other known circuits in the art. Depending upon the nature of the apparatus, a user interface 112 (e.g., keypad, display, speaker, microphone, joystick, touchscreen, touchpad, gesture sensor) may also be provided.

The processor 104 may be configured to implement or perform various functions, procedures, and processes. In one aspect of the disclosure, the processor 104 may include a backhaul traffic block 120, an access link traffic block 122, and an integrated access and backhaul (IAB) block 124. The processor 104 may execute a traffic scheduling code stored at the computer-readable medium 106 to configure the backhaul traffic block 120, access link traffic block 122, and IAB block 124, to perform the opportunistic access link/backhaul traffic scheduling operations described in relation to FIGS. 10-13. For example, the backhaul traffic block 120 may be configured by a backhaul traffic code 130 to determine the data traffic direction (e.g., downlink and/or uplink) between two scheduling entities (e.g., a macro base station and a pico base station). The access link traffic block 122 may be configured by an access link traffic code 132 to determine the data traffic direction (e.g., downlink and/or uplink) between a scheduling entity and a subordinate entity (e.g., a pico base station and a UE). The IAB block 124 may be configured by an IAB code 134 to utilize a transceiver 110 to opportunistically transmit and/or receive access link data traffic at a scheduling entity (e.g., a pico base station) in a direction determined by the access link traffic block 122 utilizing the same transmission resource (e.g., time and frequency resources) of the backhaul traffic.

The processor 104 is also responsible for managing the bus 102 and general processing, including the execution of software stored on the computer-readable medium 106. The software, when executed by the processor 104, causes the processing system 114 to perform the various functions described below for any particular apparatus. The computer-readable medium 106 may also be used for storing data that is manipulated by the processor 104 when executing software.

Figure 2:
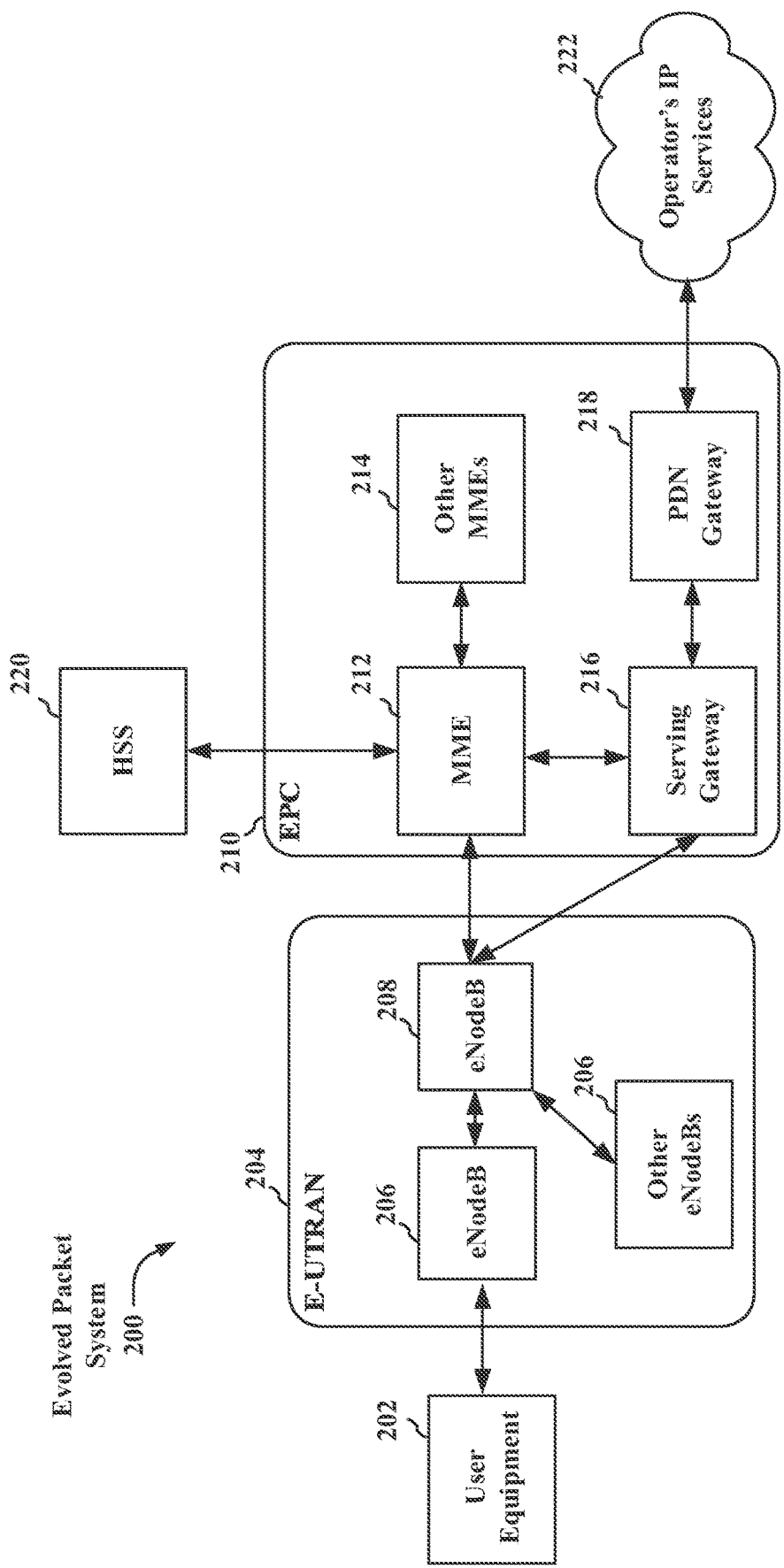
FIG. 2 is a diagram illustrating a network architecture employing various apparatuses in accordance with an aspect of the disclosure.

In some aspects of the present disclosure, an IAB system may be implemented with a network including some features of a Long Term Evolution (LTE) network, FIG. 2 is a diagram illustrating an LTE network architecture 200 employing various apparatuses (an LTE network is shown for illustrative purposes as other network types can be utilized). The LTE network architecture 200 may be referred to as an Evolved Packet System (EPS) 200. The EPS 200 may include one or more user equipment (UE) 202, an Evolved UMTS Terrestrial Radio Access Network (E-UTRAN) 204, an Evolved Packet Core (EPC) 210, a Home Subscriber Server (HSS) 220, and an Operator's IP Services 222. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes a number of evolved Node Bs including first evolved Node Bs (eNBs) 206 and a second eNB 208. The second eNB 208 may be a macro base station that provides backhaul access to the first eNBs 206. The first eNBs provide user and control plane protocol terminations toward the UE 202. The first eNBs 206 may be pico base stations that are connected to the second eNB 208 via an X2 interface or other suitable connections including a backhaul. The eNBs 206, 208 may also be referred to by those skilled in the art as a base station, a base transceiver station, a radio base station, a radio transceiver, a transceiver function, a basic service set (BSS), an extended service set (ESS), or some other suitable terminology. The first eNB 206 provides an access point to the EPC 210 for a UE 202 via an access link. In this case, the first and second eNBs 206 and 208 are scheduling entities, and the UE is a subordinate entity. Examples of UEs 202 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a wearable device, an Internet-of-Thing (IoT) device, or any other similar functioning device. The UE 202 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The second eNB 208 is connected by an S1 interface to the EPC 210. The EPC 210 includes a Mobility Management Entity (MME) 212, other MMEs 214, a Serving Gateway 216, and a Packet Data Network (PDN) Gateway 218. The MME 212 is the control node that processes the signaling between the UE 202 and the EPC 210. Generally, the MME 212 provides bearer and connection management. All user IP packets are transferred through the Serving Gateway 216, which itself is connected to the PDN Gateway 218. The PDN Gateway 218 provides UE IP address allocation as well as other functions. The PDN Gateway 218 is connected to the Operator's IP Services 222. The Operator's IP Services 222 include the Internet, the Intranet, an IP Multimedia Subsystem (IMS), and a PS Streaming Service (PSS).

Figure 3:
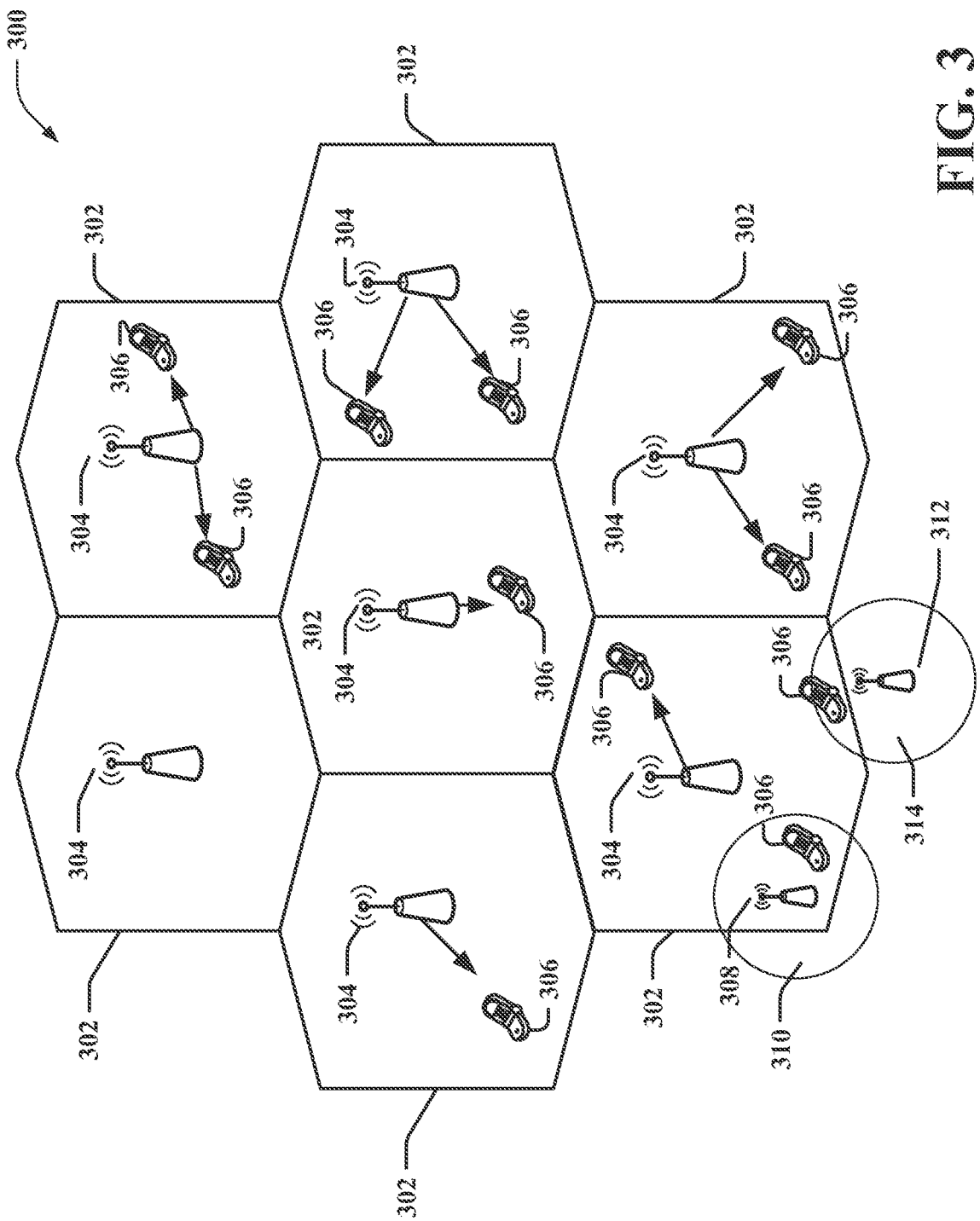
FIG. 3 is a diagram illustrating an example of an access network in accordance with an aspect of the disclosure.

FIG. 3 is a diagram illustrating an example of an access network in accordance with an aspect of the disclosure. In some examples, the access network of FIG. 3 may be a part of as an integrated access and backhaul (IAB) network. In this example, the access network 300 is divided into a number of regions or cells 302. One or more tower power class scheduling entities such as eNBs 308, 312 may have cellular regions 310, 314, respectively, that overlap with one or more of the cells 302. The lower power class eNBs 308, 312 may be femto cells (e.g., home eNBs (HeNBs)), pico cells, or micro cells. A higher power class scheduling entity, for example a macro eNB 304, is assigned to a cell 302 and may be configured to provide an access point to the EPC 210 (see FIG. 2) or other networks for all the UEs 306 (subordinate entity) in the cell 302. In some examples, a high power class macro eNB 304 only communicates with the pico or lower power class eNBs. There is no centralized controller in this example of an access network 300, but a centralized controller may be used in alternative configurations. The eNBs 304, 308, and 312 may be responsible for all radio related functions including radio bearer control, admission control, mobility control, scheduling, security, and connectivity to the serving gateway 216 (see FIG. 2).

The modulation and multiple access scheme employed by the access network 300 may vary. For example, the variance may depend on the particular telecommunications standard being deployed. In LTE applications, OFDM is used on the DL and SC-FDMA is used on the UL to support both frequency division duplexing (FDD) and time division duplexing (TDD). In one particular example, the access network 300 or some of its cell regions may be configured to support IAB TDD UL and DL.

As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO). EV-DO is an air interface standard promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 is described in documents from the 3GPP2 organization. The actual wireless communication standard and the multiple access technology employed will depend on the specific application and the overall design constraints imposed on the system.

Figure 4:
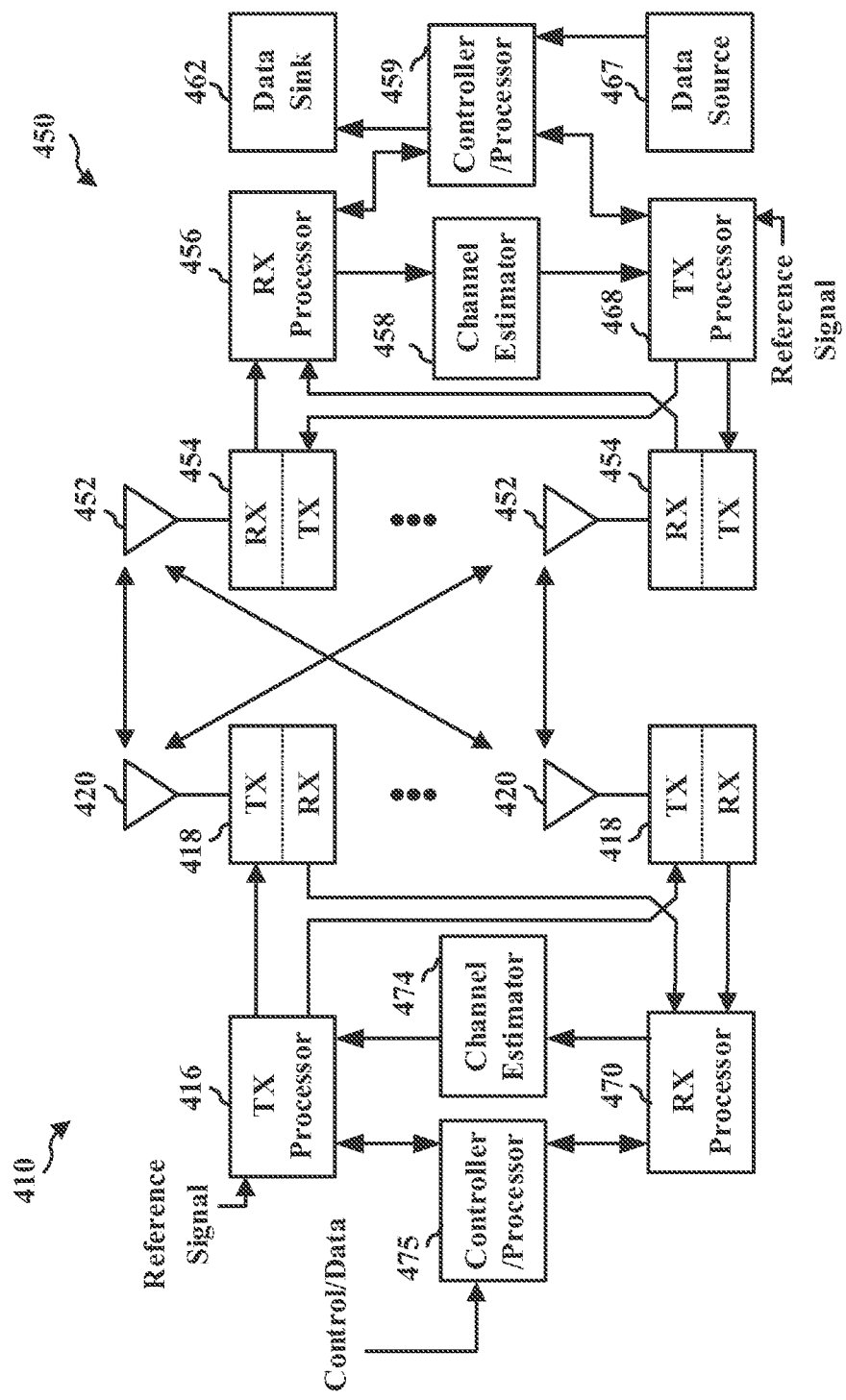
FIG. 4 is a diagram illustrating an example of a scheduling entity and a subordinate entity in accordance with an aspect of the disclosure.

FIG. 4 is a block diagram of a scheduling entity 410 in communication with a subordinate entity 450 in accordance with an aspect of the disclosure. In various aspects of the disclosure, the scheduling entity 410 may be a macro base station or a pico base station, and the subordinate entity 450 may be a UE similar to those illustrated in any of FIGS. 1-3 and 5. In the downlink (DL), upper layer packets from the core network are provided to a controller/processor 475. In the DL, the controller/processor 475 may provide header compression, ciphering, packet segmentation and reordering, multiplexing between logical and transport channels, and radio resource allocations to the subordinate entity 450 based on various priority metrics. The controller/processor 475 may also be responsible for HARQ operations, retransmission of lost packets, and signaling to the UE 450.

The TX processor 416 implements various signal processing functions for the L1 layer (i.e., physical layer). The signal processing functions includes coding and interleaving to facilitate forward error correction (FEC) at the UE 450 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an inverse fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the UE 450. Each spatial stream is then provided to a different antenna 420 via a separate transmitter 418TX. Each transmitter 418TX modulates an RF carrier with a respective spatial stream for transmission.

At the UE 450, each receiver 454RX receives a signal through its respective antenna 452. Each receiver 454RX recovers information modulated onto an RF carrier and provides the information to the receiver (RX) processor 456.

The RX processor 456 implements various signal processing functions of the L1 layer. The RX processor 456 performs spatial processing on the information to recover any spatial streams destined for the UE 450. If multiple spatial streams are destined for the UE 450, they may be combined by the RX processor 456 into a single OFDM symbol stream. The RX processor 456 then converts the OFDM symbol stream from the time-domain to the frequency domain using a Fast Fourier Transform. The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 410. These soft decisions may be based on channel estimates computed by the channel estimator 458. The soft decisions are then decoded and deinterleaved to recover the data and control signals that were originally transmitted by the eNB 410 on the physical channel. The data and control signals are then provided to the controller/processor 459.

In the UL, the control/processor 459 may provide demultiplexing between transport and logical channels, packet reassembly, deciphering, header decompression, control signal processing to recover upper layer packets from the core network. The upper layer packets are then provided to a data sink 462, which represents all the protocol layers above the L2 layer. Various control signals may also be provided to the data sink 462 for L3 processing. The controller/processor 459 is also responsible for error detection using an acknowledgment (ACK) and/or negative acknowledgment (NACK) protocol to support HARQ operations.

In the uplink (UL), a data source 467 is used to provide upper layer packets to the controller/processor 459. The data source 467 represents all protocol layers above the L2 layer (L2). Similar to the functionality described in connection with the DL transmission by the eNB 410, the controller/processor 459 implements the L2 layer for the user plane and the control plane by providing header compression, ciphering, packet segmentation and reordering, and multiplexing between logical and transport channels based on radio resource allocations by the eNB 410. The controller/processor 459 is also responsible for HARQ operations, retransmission of lost packets, and signaling to the eNB 410.

Channel estimates derived by a channel estimator 458 from a reference signal or feedback transmitted by the eNB 410 may be used by the TX processor 468 to select the appropriate coding and modulation schemes, and to facilitate spatial processing. The spatial streams generated by the TX processor 468 are provided to different antenna 452 via separate transmitters 454TX. Each transmitter 454TX modulates an RE carrier with a respective spatial stream for transmission.

The UL transmission is processed at the eNB 410 in a manner similar to that described in connection with the receiver function at the UE 450. Each receiver 418RX receives a signal through its respective antenna 420. Each receiver 418RX recovers information modulated onto an RE carrier and provides the information to an RX processor 470. The RX processor 470 implements the L1 layer.

In the UL, the control/processor 459 may provide demultiplexing between transport and logical channels, packet reassembly, deciphering, header decompression, control signal processing to recover upper layer packets from the UE 450. Upper layer packets from the controller/processor 475 may be provided to the core network. The controller/processor 459 is also responsible for error detection using an ACK and/or NACK protocol to support HARQ operations.

In one aspect of the disclosure, the processing system 114 described in relation to FIG. 1 may include some or all components of the scheduling entity 410. In particular, the processing system 114 may include the TX processor 416, the RX processor 470, and the controller/processor 475. In one aspect of the disclosure, the processing system 114 described in relation to FIG. 1 may include some or all components of the subordinate entity 450. In particular, the processing system 114 may include the TX processor 468, the RX processor 456, and the controller/processor 459.

Figure 5:
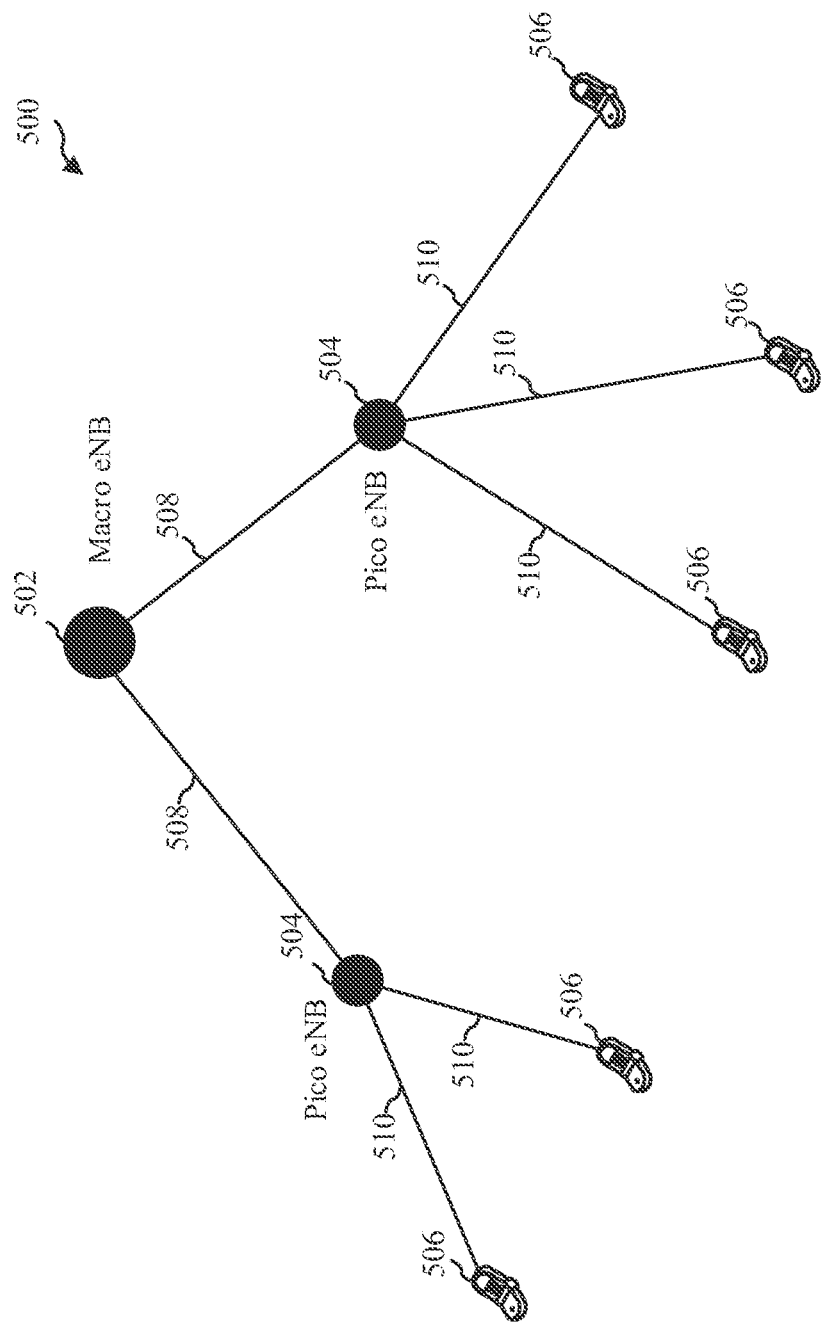
FIG. 5 is a diagram illustrating an example of an integrated access and backhaul (IAB) network in accordance with an aspect of the disclosure.

FIG. 5 is a diagram illustrating an example of an integrated access and backhaul (IAB) network 500 configured to utilize opportunistic access link/backhaul scheduling in accordance with an aspect of the disclosure. The wireless IAB network 500 may include any numbers of scheduling entities (e.g., macro base stations, pico base stations) and UEs. In this example, a macro base station may be a macro eNB, and a pico base station may be a pico eNB. In the IAB network 500, a macro eNB 502 may establish backhaul connections 508 with one or more pico eNBs 504. Each pico eNB 504 may establish access link 510 connections with one or more UEs 506. Each connection may include one or more carriers or channels for facilitating communication between base stations and UEs. The macro eNB, pico eNBs, and UEs illustrated in FIG. 5 may be any of the eNBs and UEs illustrated in FIGS. 1-4 discussed above. In some aspects of the disclosure, there may be additional layers of eNBs or base stations between the macro eNB 502 and the pico eNB 504. In one example, each layer between the macro eNB 502 and pico eNB 504 may include a base station or eNB configured to relay communication between the macro eNB 502 and pico eNB 504. In some examples, one or more backhauls and access links may be assigned common transmission resources for opportunistic access link and/or backhaul communication. Some examples of transmission resources include time slots, frequency spectrum, channels, carriers, spreading codes, scrambling codes.

Figure 6:
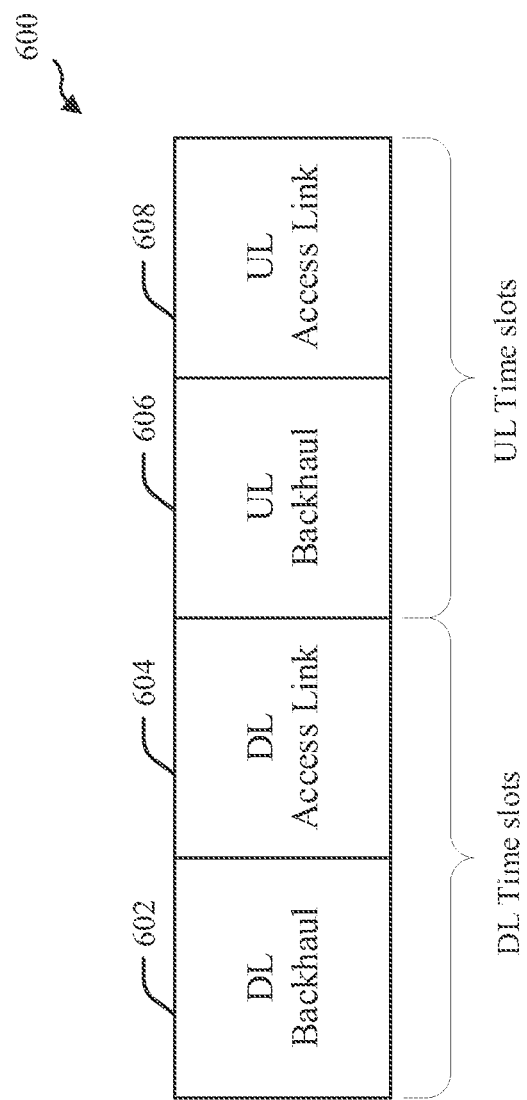
FIG. 6 is a diagram illustrating an example of a time division duplexing (TDD) frame structure in accordance with an aspect of the disclosure.

FIG. 6 is a diagram illustrating an example of a time division duplexing (TDD) frame structure 600 in accordance with an aspect of the disclosure. The TDD frame structure 600 illustrates an example of the time division of backhaul subframes and access link subframes. TDD can be utilized in the IAB network of FIG. 5 or other TDD networks. In the IAB network 500, for example, the backhaul communication between a macro eNB 502 and a pico eNB 504 may be time-divided into UL subframes and DL subframes utilizing the TDD frame structure 600. Similarly, the access link communication between a pico eNB 504 and a UE 506 may be time-divided into UL subframes and DL subframes utilizing the TDD frame structure 600.

In the downlink (DL) time slots, backhaul DL traffic 602 and access link DL traffic 604 may be time interleaved in different time slots or subframes. Similarly, in the uplink (UL) time slots, the backhaul UL traffic 606 and access link UL traffic 608 may be time interleaved in different time slots or subframes. While FIG. 6 illustrates a particular time interleaving order for the backhaul traffic and access link traffic, other combinations are possible. For example, the backhaul DL traffic 602 and access link DL traffic 604 may be reversed in time sequence. Similarly, the backhaul UL traffic 606 and access link UL traffic 608 may be reversed in time sequence. In some aspects of the disclosure, the interleaving order of the backhaul traffic and access link traffic may be different or the same for the DL and UL time slots. In some aspects/embodiments of the disclosure, the interleaving order of the backhaul traffic and access link traffic may be different or dynamically changed for different frames. In some examples, the time slots assigned to the backhaul traffic and access link traffic may be different or the same based on various factors and designs.

Various aspects of the present disclosure provide a wireless communications system in which an access link can opportunistically utilize the same transmission resource assigned to a backhaul such that access link transmission and backhaul transmission may occur simultaneously. For example, in an IAB network 500, the access link and the backhaul may utilize the same frequency spectrum (e.g., same carrier or channel) for communication in the same UL and/or DL time slot. In one aspect of the disclosure, the access link may opportunistically utilize the same transmission resource of the backhaul when the interference from such opportunistic access link transmission will not cause significant or undesirable interference to the backhaul. The access link transmission is opportunistic when the access link transmission occurs under certain predetermined conditions, while it is not originally scheduled. For example, opportunistic transmission may occur irregularly, and maybe bursty, dynamic, and/or variable. That is, an opportunistic access link transmission may not have a predetermined schedule in general. For example, an opportunistic access link transmission may be scheduled irregularly. The opportunistic access link transmission may utilize the transmission resource (e.g., time and frequency resources) originally scheduled for the backhaul link at the same time, for example, in the same time slot or time frame for uplink or downlink transmission. In some examples, an opportunistic access link transmission may utilize a full time slot or only a portion of a time slot scheduled for a backhaul link.

Figure 7:
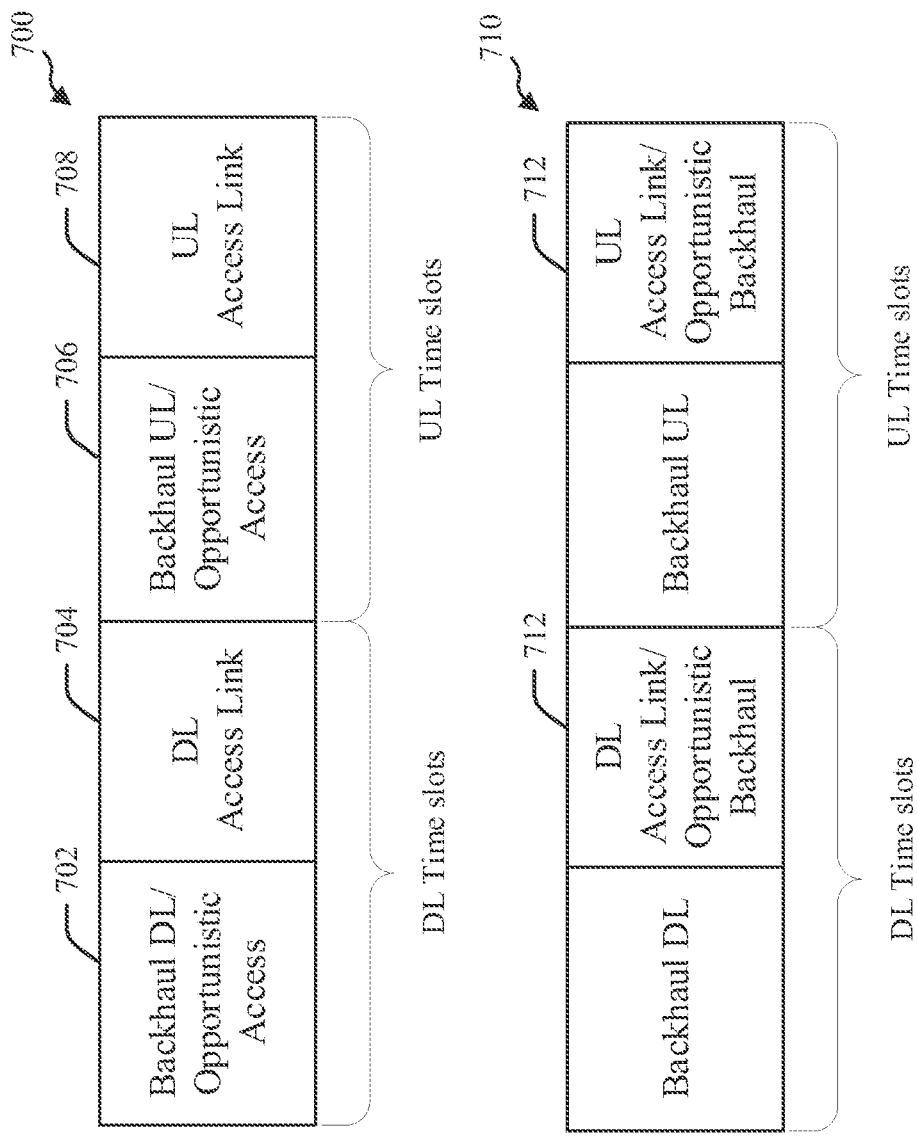
FIG. 7 is a diagram illustrating two frame structures for opportunistic access link or backhaul scheduling in accordance with some aspects of the disclosure.

FIG. 7 is a diagram illustrating examples of frame structures for opportunistic access link or backhaul scheduling in accordance with an aspect of the disclosure. A frame structure 700 may be utilized to schedule backhaul and opportunistic access link traffic. In an IAB network 500, the backhaul communication between a macro eNB 502 and a pico eNB 504 may be time-divided into UL subframes and DL subframes utilizing the frame structure 700. Similarly, the access link communication between a pico eNB 504 and a UE 506 may be time-divided into UL subframes and DL subframes utilizing the frame structure 700. In various aspects of the disclosure, an access link may opportunistically utilize the same transmission resource (e.g., time and frequency resources) assigned to a backhaul when the interference from the opportunistic access link will not cause significant or undesirable amount of interference to the backhaul. In one example, an access link is opportunistic when the access link traffic (UL and/or DL) is selectively scheduled under certain conditions (e.g., predetermined conditions) in a time slot originally assigned only to the backhaul, and the access link traffic and backhaul link traffic may occur simultaneously during at least a portion of the same time slot or subframe.

Referring to FIG. 7, a first time slot 702 or subframe may be assigned (or reserved/scheduled) to backhaul DL traffic, and a second time slot 704 or subframe may be assigned to access link DL traffic. In one aspect of the disclosure, the access link traffic (DL or UL) may be opportunistically scheduled in the time slot 702 that is originally assigned or scheduled to the backhaul when the access link traffic will not cause significant undesirable interference to the backhaul DL. A third time slot 706 or subframe may be assigned to backhaul UL traffic, and a fourth time slot 708 or subframe may be assigned to access link UL traffic. In one aspect of the disclosure, the access link traffic (DL or UL) may be opportunistically scheduled in the third time slot 706 originally assigned or scheduled only to the backhaul when the access link traffic will not cause significant undesirable interference to the backhaul UL. In general, an opportunistic access link may occur in a first time period (e.g., time slots 702 and 704) different from a second time period (e.g., time slots 704 and 708) that is regularly scheduled for the access link traffic. For example, an opportunistic access link may be scheduled in a time period (e.g., 702 and 706) scheduled for a backhaul link between a scheduling entity and an UE.

In other aspects of the disclosure, the concept of an opportunistic access link, may be extended to an opportunistic backhaul as illustrated in a subframe 710. The subframe structure 710 may be utilized to schedule backhaul and access link traffic in an IAB network 500. A backhaul may opportunistically utilize the same transmission resource (e.g., time and frequency resources) originally assigned only to an access link when the interference from the opportunistic backhaul will not cause significant or undesirable amount of interference to the access link. In one example, the backhaul is opportunistic when the backhaul traffic (UL and/or DL) is selectively scheduled under certain conditions (e.g., predetermined conditions) in a time slot 712 that is originally assigned only to the access link, and the access link traffic (UL or DL) and opportunistic backhaul traffic may occur simultaneously during at least a portion of the same time slot or subframe.

The present disclosure is not limited to the subframe examples of FIG. 7. In other aspects of the disclosure, other frame structures may be used for opportunistic access link/backhaul scheduling. In some examples, opportunistic access link traffic may be scheduled only in a backhaul DL time slot or a backhaul UL time slot. In some examples, opportunistic access link traffic may be only UL traffic or DL traffic. Similar variations may be applied to the opportunistic backhaul traffic.

Figure 8:
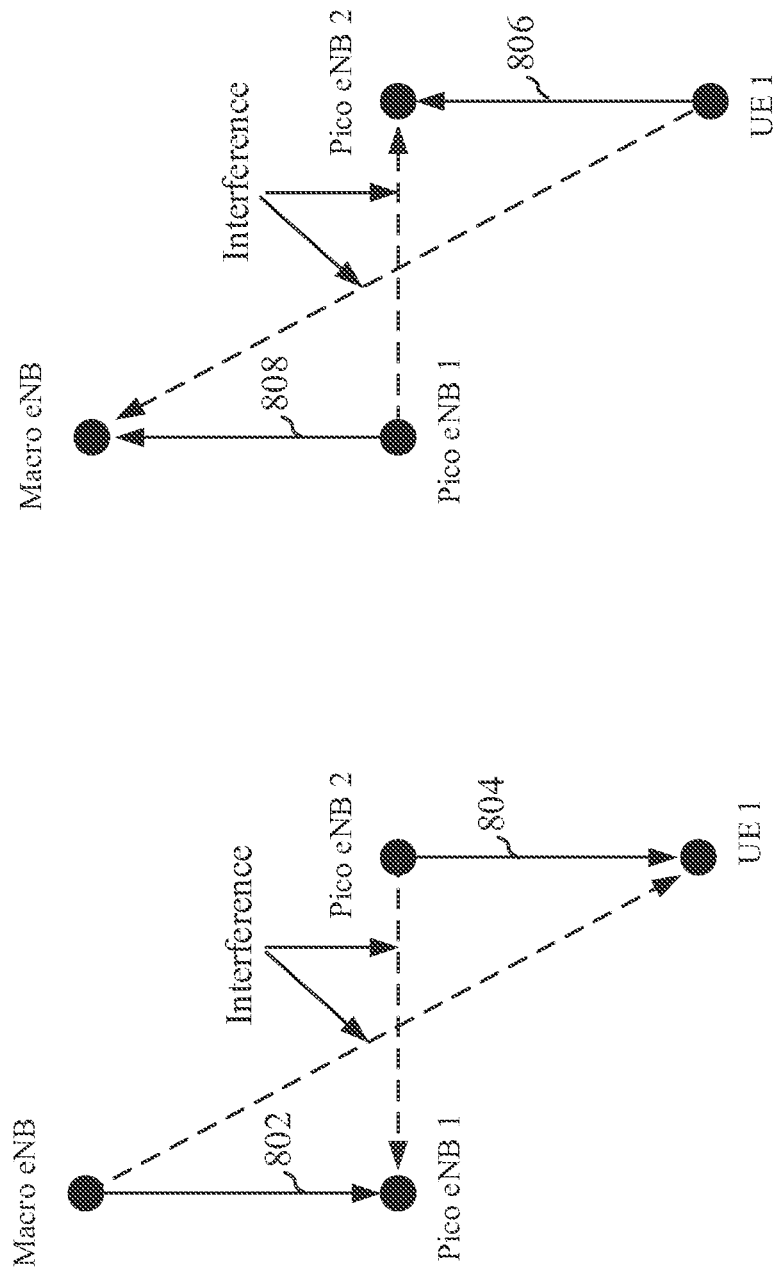
FIG. 8 is a diagram illustrating two examples of synchronized IAB scheduling in accordance with some aspects of the disclosure.

Two examples of backhaul and access link traffic scheduling (or patterns) are synchronized scheduling and cross-synchronized scheduling. FIG. 8 is a diagram illustrating two examples of synchronized scheduling in accordance with some aspects of the disclosure. In synchronized scheduling, the access link traffic and backhaul traffic occur in the same direction (e.g., UL or DL). In a DL example, the backhaul traffic 802 (macro eNB-to-pico eNB1) and the access link traffic 804 (pico eNB2-to-UE1) are both in the DL traffic direction. The DL transmission from the macro eNB may cause interference to the UE1. In a UL example, the access link traffic 806 (UE1-to-pico eNB2) and the backhaul traffic 808 (pico eNB1-to-macro eNB) both occur in the UL direction. The UL transmission from the UE1 may cause interference to the macro eNB. In this example, the access links 804, 806 and backhauls 802, 808 may be scheduled to utilize the same transmission resource (e.g., same carrier/channel or time slot).

Figure 9:
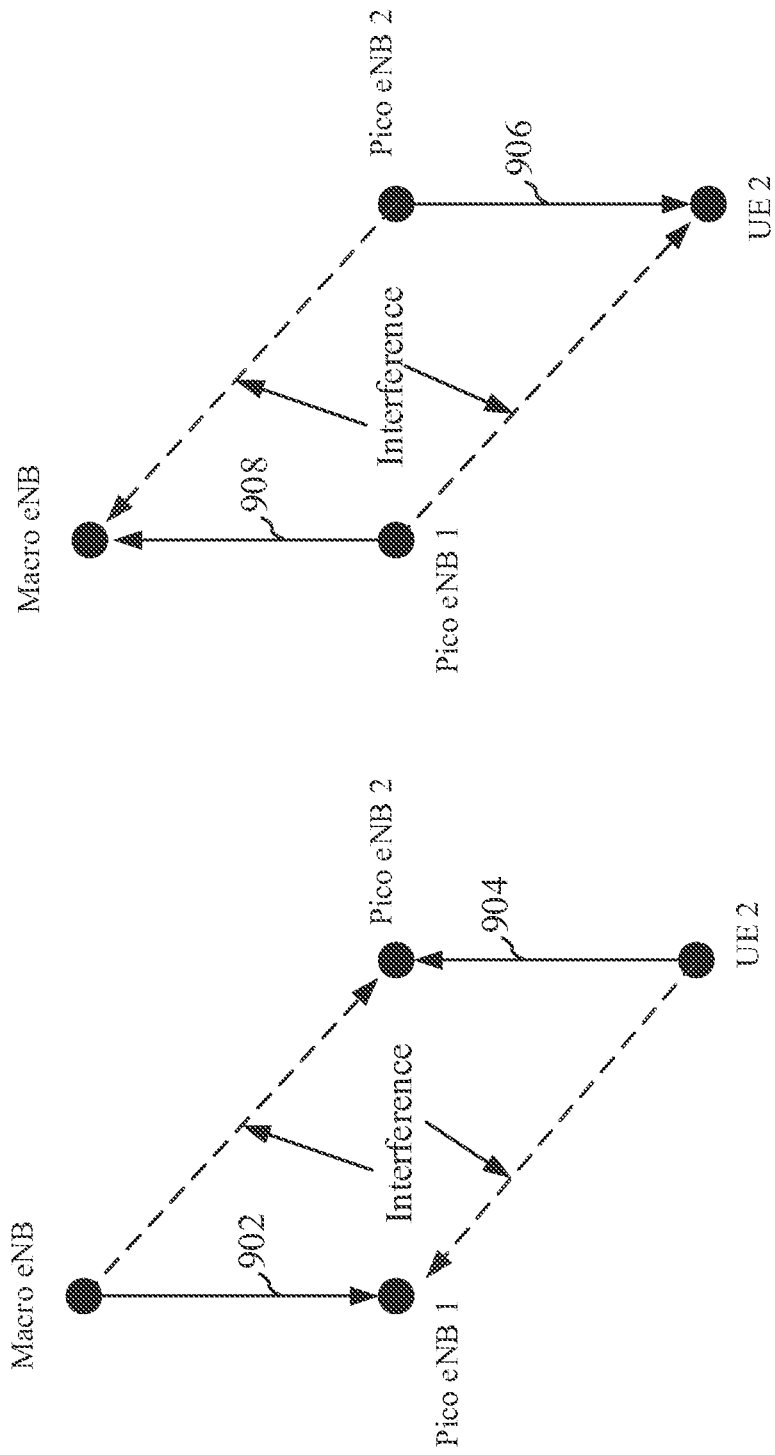
FIG. 9 is a diagram illustrating two examples of cross-synchronized IAB scheduling in accordance with some aspects of the disclosure.

FIG. 9 is a diagram illustrating two examples of cross-synchronized scheduling in accordance with some aspects of the disclosure. In cross-synchronized scheduling, the access link traffic and backhaul traffic are scheduled to transmit in different directions. In one example, the backhaul traffic 902 (macro eNB-to-pico eNB1) and the access link traffic 904 (UE2-to-pico eNB2) are respectively scheduled in the DL and UL directions. In this case, the DL backhaul transmission from the macro eNB may cause interference to the pico eNB2, and the UL access link transmission from the UE2 may cause interference to the pico eNB1. In another example, the access link traffic 906 (pico eNB2-to-UE2) and the backhaul traffic 908 (pico eNB1-to-macro eNB) are respectively scheduled in the DL and UL directions. The DL access link transmission from the pico eNB2 may cause interference to the macro eNB, and the UL backhaul transmission from the pico eNB1 may cause interference to the UE2. In this example, the access links 904, 906 and backhauls 902, 908 may be scheduled to use the same transmission resource (e.g., frequency spectrum and time slot).

In the backhaul DL example of FIG. 8, the interference between the backhaul traffic 802 and the access link traffic 804 is from the pico eNB 2 to the pico eNB 1, and from the macro eNB to the UE. In the backhaul UL example of FIG. 8, the interference between the backhaul traffic 808 and the access link traffic 806 is from the pico eNB 1 to the pico eNB 2, and from the UE to the macro eNB. In the backhaul DL example of FIG. 9, the interference between the backhaul traffic 902 and the access link traffic 904 is from the UE to the pico eNB 1, and from the macro eNB to the pico eNB 2. In the backhaul UL example of FIG. 9, the interference between the backhaul traffic 908 and access link traffic 906 is from the pico eNB 1 to the UE, and from the pico eNB 2 to the macro eNB. In general, the base stations (e.g., pico eNB 1, pico eNB 2, and macro eNB) have greater transmit power than the UEs, and the distance between nearby pico eNBs may be smaller than the distance between the pico eNBs and the macro eNB. In this case, cross-synchronized scheduling may reduce the interference between the pico eNBs. Therefore, cross-synchronized scheduling of backhaul traffic and access link traffic may reduce or minimize the interference between backhaul traffic and opportunistic access link traffic.

Figure 10:
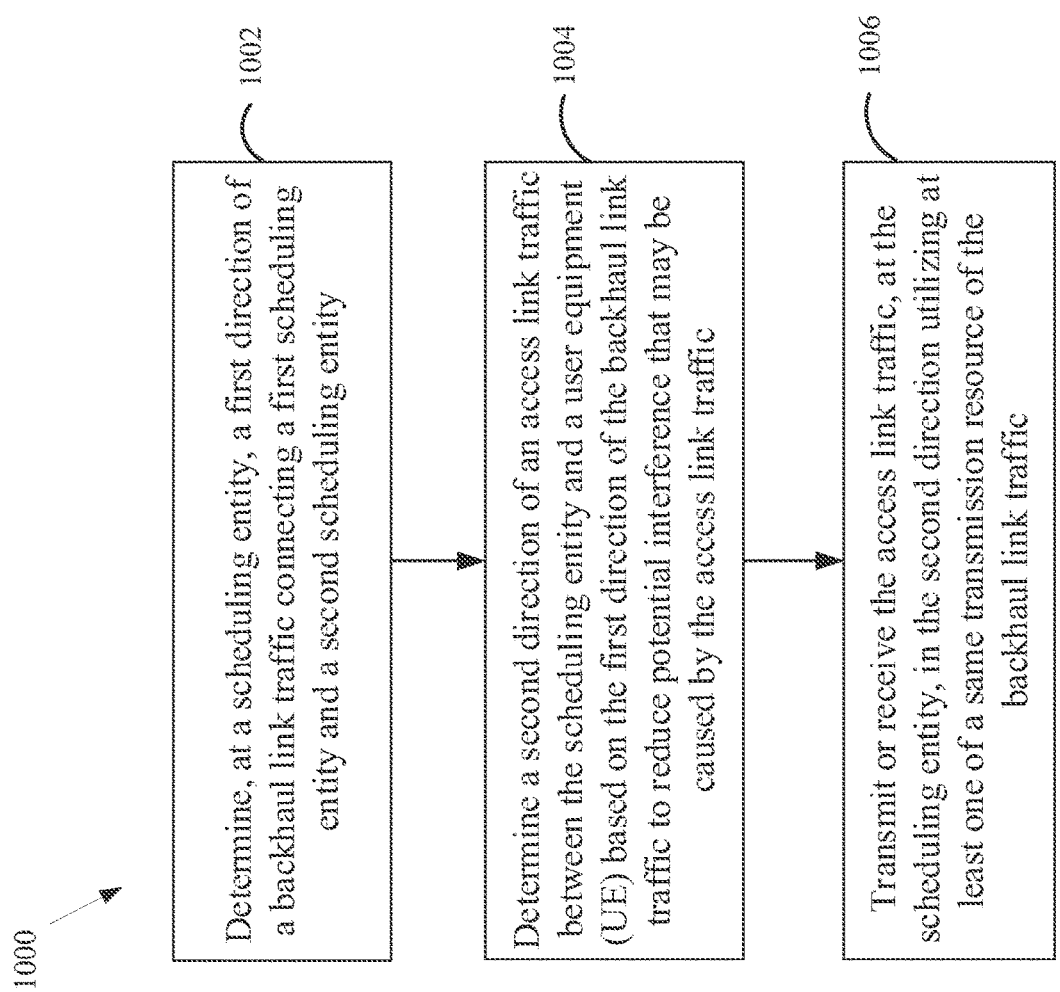
FIG. 10 is a flow chart illustrating an opportunistic access link scheduling method operable in an IAB wireless network in accordance with an aspect of the disclosure.

FIG. 10 is a flow chart illustrating an opportunistic access link scheduling method 1000 operable in a wireless network in accordance with an aspect of the disclosure. The method may be performed by a scheduling entity, for example, a pico eNB or base station illustrated in any of FIGS. 1-5, 8 and/or 9. In one aspect of the disclosure, a scheduling entity (pico eNB) may utilize a backhaul traffic block 120, an access link traffic block 122, and an IAB block 124 illustrated in FIG. 1 to perform the scheduling method 1000. In one particular example, a pico eNB (e.g., a pico eNB 2 of FIG. 8 or 9) may perform the access link scheduling method 1000 to schedule an access link in an IAB network 500 (see FIG. 5). At block 1002, the method may utilize, at a scheduling entity (e.g., pico eNB 2), the backhaul traffic block 120 to determine a first direction of a backhaul link traffic (first data traffic) between a first scheduling entity and a second scheduling entity. For example, the first scheduling entity may be a macro eNB, and the second scheduling entity may be a pico eNB 1, as shown in FIG. 8 or 9.

Figure 11:
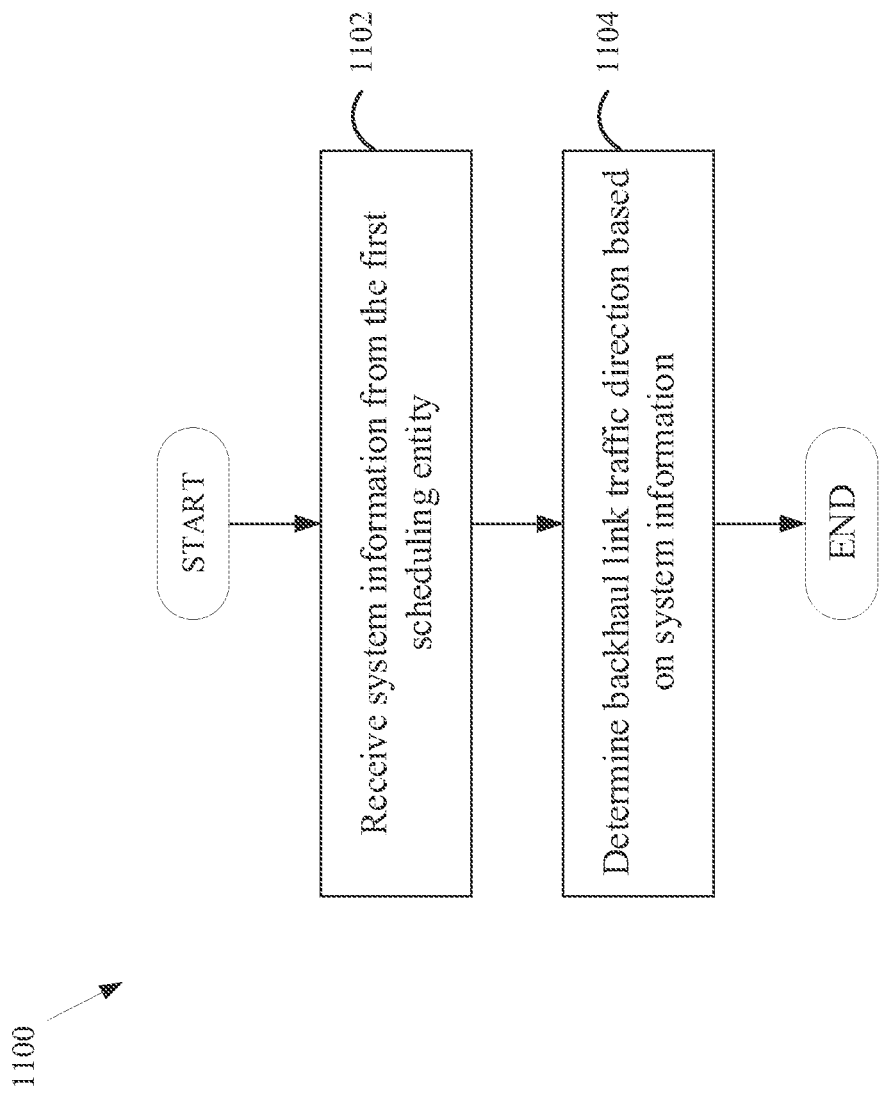
FIG. 11 is a flow chart illustrating a method for determining the backhaul traffic direction between scheduling entities in accordance with an aspect of the disclosure.

FIG. 11 is a flow chart illustrating a method 1100 for determining the backhaul traffic direction between the first scheduling entity and second scheduling entity. In one example, at block 1102, the scheduling entity (e.g., pico eNB 2) may receive system information from the first scheduling entity (macro eNB) through a suitable communication channel or method. In one example, the information may be included in one or more system information blocks (SIBs) broadcasted by the macro eNB using a control channel. At block 1104, the scheduling entity may determine the backhaul link traffic direction based on the received system information. For example, the received system information may contain certain data that indicate the direction of the backhaul link traffic between the macro eNB (first scheduling entity) and pico eNBs (second scheduling entity).

Referring back to FIG. 10, at block 1004, the method may utilize the access link traffic block 122 to determine a second direction of an access link traffic (second data traffic) between the scheduling entity (e.g., pico eNB 2) and a user equipment (UE) based on the first direction of the backhaul link traffic to reduce potential interference that may be caused by the access link traffic. For example, the scheduling entity may be the pico eNB 2 of FIG. 8 or 9, and the UE may be the UE of FIG. 8 or 9. In one example, cross-synchronized scheduling (see FIG. 9) may be used to reduce the interference that may be caused by the access link.

Figure 12:
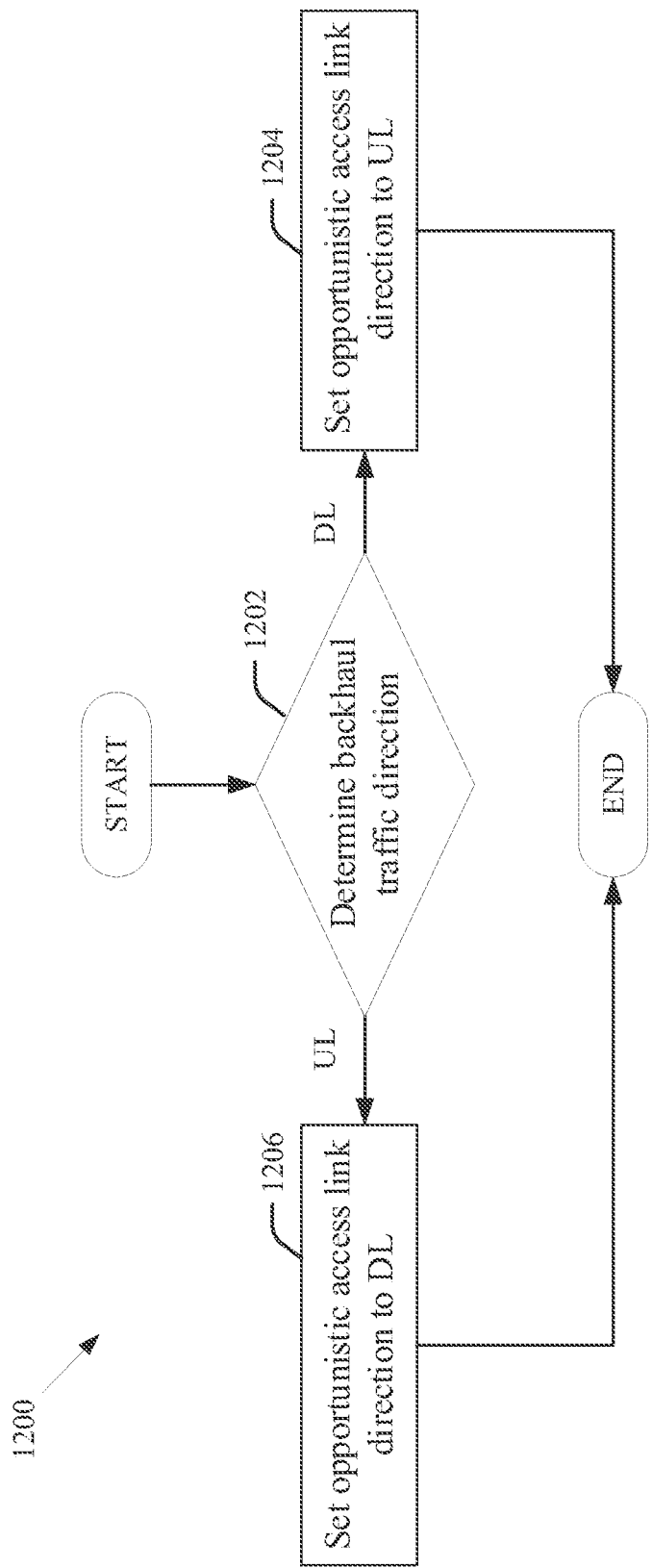
FIG. 12 is a flow chart illustrating a method for determining an opportunistic access link traffic direction between a scheduling entity and a user equipment in accordance with an aspect of the disclosure.

FIG. 12 is a flow chart illustrating a method 1200 for determining an opportunistic access link traffic direction in accordance with an aspect of the disclosure. In one example, the method 1200 may be operable at block 1004 of FIG. 10. At decision block 1202, a scheduling entity (e.g., pico eNB 2 of FIG. 9) determines a traffic direction of a backhaul. For example, the backhaul may be a backhaul link between a macro eNB and a pico eNB 1 as shown in FIG. 9. If it is determined that the backhaul direction is DL, the method proceeds to block 1204; otherwise, the method proceeds to block 1206. At block 1204, the scheduling entity sets the opportunistic access link traffic to be UL. At block 1206, the scheduling entity sets the opportunistic access link traffic to be DL. In this particular example, the scheduling entity sets the opportunistic access link traffic direction to be opposite to that of the backhaul in the same time slot. In other aspects of the disclosure, the backhaul traffic and the access link traffic may be set to the same direction.

Furthermore, referring back to FIG. 10, at block 1006, the method 1000 may utilize the IAB block 124 to opportunistically transmit or receive the access link traffic, at the scheduling entity, in the second direction utilizing at least one of the same transmission resource of the backhaul link traffic. Examples of the transmission resource may include a frequency spectrum (channel or carrier), a time slot (or subframe) of a TDD system, a spreading code, and other resources commonly used for access link and backhaul link transmissions. The scheduling entities may communicate with each other via one or more channels including the backhauls between the scheduling entities. For example, the scheduling entity (e.g., pico eNB 2) may determine the traffic direction between the first scheduling entity (e.g., macro eNB) and second scheduling entity (e.g., pico eNB 1) based on system information blocks received from the first scheduling entity.

Figure 13:
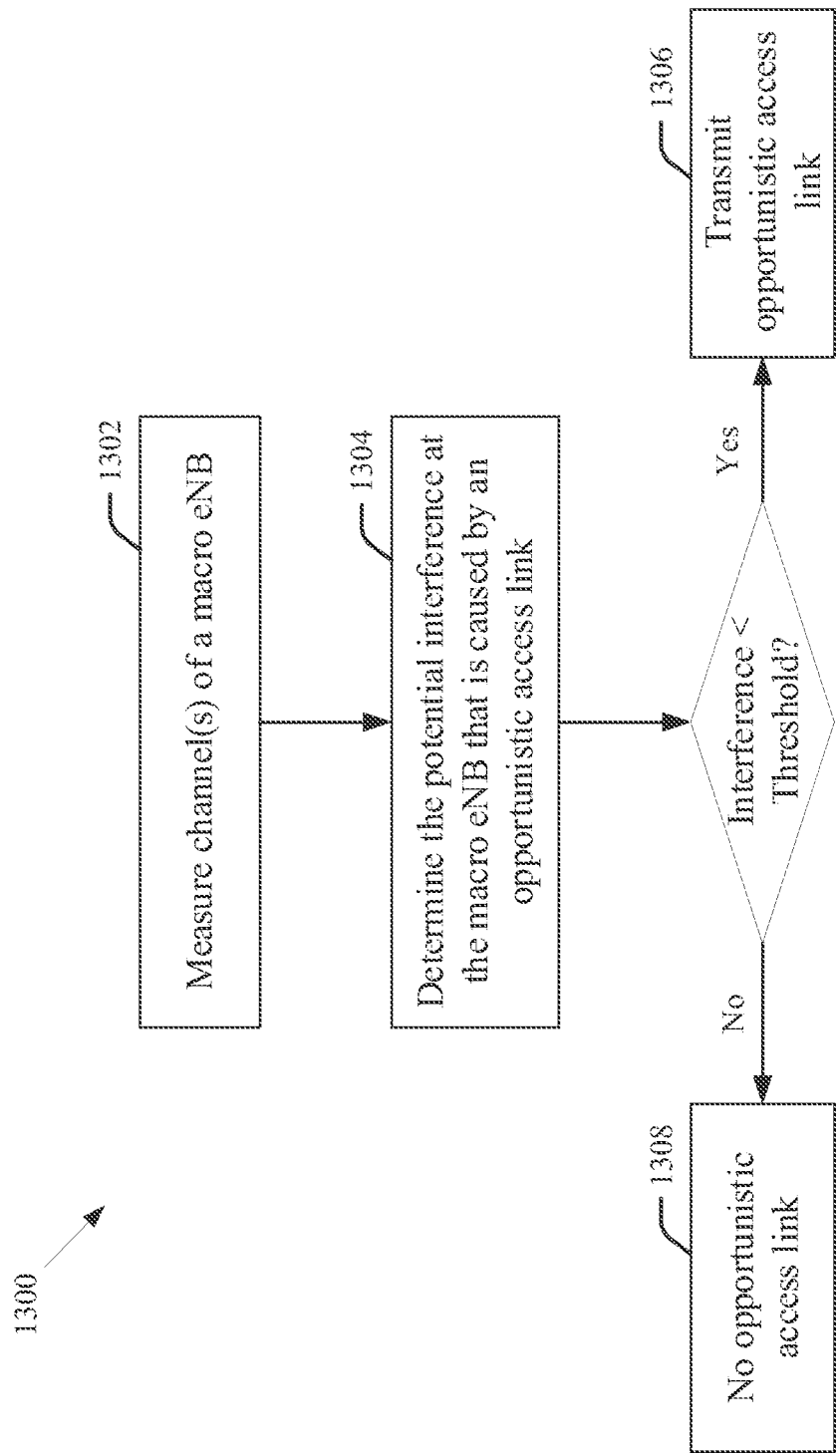
FIG. 13 is a flow chart illustrating a method of opportunistic access link transmission in accordance with an aspect of the disclosure.

FIG. 13 is a flow chart illustrating a method 1300 of opportunistic access link transmission in accordance with an aspect of the disclosure. In one example, the method 1300 may be operable at block 1006 of FIG. 10. Assuming, it has been determined that in a backhaul time slot, an access link may be utilized opportunistically. At block 1302, a scheduling entity (e.g., a pico eNB 2 of FIG. 9) may measure one or more channels (e.g., pilots or other suitable signals) of a macro eNB. At block 1304, the scheduling entity determines the potential interference at the macro eNB that may be caused by the opportunistic access link. In one example, the macro eNB may transmit a signal-to-noise ratio (SNR) value of its own uplink, so that the scheduling entity may calculate a signal-to-interference ratio (SIR) at the macro eNB, and thus may determine if it may cause too much interference to the backhaul when the access link transmission occurs. If the potential interference is less than a predetermined threshold, the access link may opportunistically transmit at block 1306; otherwise, the opportunistic access link is not scheduled.

In other aspects of the disclosure, the concept of the opportunistic access link scheduling as described above may be implemented on the backhaul. An opportunistic backhaul may be scheduled to take place using the same transmission resource of an access link simultaneously if the opportunistic backhaul will not cause significant or undesirable interference to the access link It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method of wireless communication operable at a macro base station communicatively connected with a first pico base station and a second pico base station, comprising:
    scheduling backhaul link traffic between the macro base station and the first pico base station utilizing a transmission resource;
    determining potential interference at the macro base station or the first pico base station, caused by opportunistically utilizing the transmission resource for opportunistic access link traffic between the second pico base station and a user equipment (UE); and
    if the potential interference caused by the opportunistic access link traffic is less than a predetermined threshold, rescheduling the transmission resource for the opportunistic access link traffic.

2. The method of claim 1, further comprising determining the potential interference based on a signal-to-interference ratio (SIR) value of the backhaul link traffic.

3. The method of claim 1,
    wherein the backhaul link traffic comprises downlink traffic, and the opportunistic access link traffic comprises uplink traffic; or
    wherein the backhaul link traffic comprises uplink traffic, and the opportunistic access link traffic comprises downlink traffic.

4. The method of claim 1,
    wherein the backhaul link traffic comprises downlink traffic, and the opportunistic access link traffic comprises downlink traffic; or
    wherein the backhaul link traffic comprises uplink traffic, and the opportunistic access link traffic comprises uplink traffic.

5. The method of claim 1, wherein the backhaul link traffic and the opportunistic access link traffic occur simultaneously in at least a portion of a time slot.

6. The method of claim 1, further comprising:
    scheduling access link traffic between the second pico base station and the UE utilizing the transmission resource;
    determining potential interference at the UE or the second pico base station, caused by opportunistically utilizing the transmission resource for opportunistic backhaul link traffic between the macro base station and the first pico base station; and
    if the potential interference caused by the opportunistic backhaul link traffic is less than a predetermined threshold, rescheduling the transmission resource for the opportunistic backhaul link traffic.

7. A macro base station for wireless communication, comprising:
    a communication interface configured for wireless communication with a first pico base station and a second pico base station;
    a memory comprising executable code; and
    a processor operatively coupled to the communication interface and the memory,
    wherein the processor and the memory are configured to:
    schedule backhaul link traffic between the macro base station and the first pico base station utilizing a transmission resource;
    determine potential interference at the macro base station or the first pico base station, caused by opportunistically utilizing the transmission resource for opportunistic access link traffic between the second pico base station and a user equipment (UE); and
    if the potential interference caused by the opportunistic access link traffic is less than a predetermined threshold, reschedule the transmission resource for the opportunistic access link traffic.

8. The macro base station of claim 7, wherein the processor and the memory are further configured to:
    determine the potential interference based on a signal-to-interference ratio (SIR) value of the backhaul link traffic.

9. The macro base station of claim 7,
    wherein the backhaul link traffic comprises downlink traffic, and the opportunistic access link traffic comprises downlink traffic; or
    wherein the backhaul link traffic comprises uplink traffic, and the opportunistic access link traffic comprises uplink traffic.

10. The macro base station of claim 7,
    wherein the backhaul link traffic comprises downlink traffic, and the opportunistic access link traffic comprises uplink traffic; or
    wherein the backhaul link traffic comprises uplink traffic, and the opportunistic access link traffic comprises downlink traffic.

11. The macro base station of claim 7, wherein the processor and the memory are further configured to:
    schedule the backhaul link traffic and the opportunistic access link traffic to occur simultaneously in at least a portion of a time slot.

12. The macro base station of claim 7, wherein the processor and the memory are further configured to:
    schedule access link traffic between the second pico base station and the UE utilizing the transmission resource;
    determine potential interference at the UE or the second pico base station, caused by opportunistically utilizing the transmission resource for opportunistic backhaul link traffic between the macro base station and the first pico base station; and if the potential interference caused by the opportunistic backhaul link traffic is less than a predetermined threshold, reschedule the transmission resource for the opportunistic backhaul link traffic.

13. A macro base station for wireless communication, comprising:

a communication interface configured for wireless communication with a first pico base station and a second pico base station;

a memory comprising executable code; and a processor operatively coupled to the communication interface and the memory, wherein the processor and the memory are configured to:

schedule access link traffic between the second pico base station and a user equipment (UE) utilizing a transmission resource;

determine potential interference at the UE or the second pico base station, caused by opportunistically utilizing the transmission resource for opportunistic backhaul link traffic between the macro base station and the first pico base station; and if the potential interference caused by the opportunistic backhaul link traffic is less than a predetermined threshold, reschedule the transmission resource for the opportunistic backhaul link traffic.

14. The macro base station of claim 13, wherein the processor and the memory are further configured to:

determine the potential interference based on a signal-to-interference ratio (SIR) value of the access link traffic.

15. The macro base station of claim 13, wherein the access link traffic comprises downlink traffic, and the opportunistic backhaul link traffic comprises uplink traffic; or wherein the access link traffic comprises uplink traffic, and the opportunistic backhaul link traffic comprises downlink traffic.

16. The macro base station of claim 13;

wherein the access link traffic comprises downlink traffic, and the opportunistic backhaul link traffic comprises downlink traffic; or wherein the access link traffic comprises uplink traffic, and the opportunistic backhaul link traffic comprises uplink traffic.

17. The macro base station of claim 13, wherein the access link traffic and the opportunistic backhaul link traffic occur simultaneously in at least a portion of a time slot.

18. The macro base station of claim 13, wherein the processor and the memory are further configured to:

schedule backhaul link traffic between the macro base station and the first pico base station utilizing the transmission resource;

determine potential interference at the macro base station or the first pico base station, caused by opportunistically utilizing the transmission resource for opportunistic access link traffic between the second pico base station and the UE; and if the potential interference caused by the opportunistic access link traffic is less than a predetermined threshold, reschedule the transmission resource for the opportunistic access link traffic.

* * * * *